United States Patent [19]
Gaboury

[11] Patent Number: 5,548,398
[45] Date of Patent: Aug. 20, 1996

[54] ILLUMINANT DISCRIMINATOR PROVIDING DETECTION OF HIGH EFFICIENCY ILLUMINATION

[75] Inventor: Michael J. Gaboury, Burnsville, Minn.

[73] Assignee: Eastman Kodak Company, Rochester, N.Y.

[21] Appl. No.: 343,167

[22] Filed: Nov. 22, 1994

[51] Int. Cl.$^6$ .................................................. G01J 1/42
[52] U.S. Cl. ........................... 356/218; 356/221; 356/223; 356/224; 250/214 P; 354/425
[58] Field of Search .................................. 356/218–219, 356/221, 223, 224; 250/214 R; 354/425–427

[56] References Cited

U.S. PATENT DOCUMENTS

| | | | |
|---|---|---|---|
| 3,969,678 | 7/1976 | Asahara et al. | 328/167 |
| 4,041,308 | 8/1977 | Fujita | 250/214 P |
| 4,220,412 | 9/1980 | Shroyer et al. | 356/218 |
| 4,258,993 | 3/1981 | Frank | 250/214 P |
| 4,764,732 | 8/1988 | Dion | 330/59 |
| 4,827,119 | 5/1989 | Gaboury | 250/214 |
| 4,847,680 | 7/1989 | Okino | 358/29 |
| 5,008,526 | 4/1991 | Green | 250/214 |
| 5,037,198 | 8/1991 | Gaboury | 356/218 |
| 5,202,553 | 4/1993 | Geller | 250/214 |
| 5,406,348 | 4/1995 | Wheeler | 354/402 |

*Primary Examiner*—Frank Gonzalez
*Assistant Examiner*—Jason D. Eisenberg
*Attorney, Agent, or Firm*—David M. Woods

[57] ABSTRACT

An illuminant discriminator distinguishes a range of separate illuminants, including high efficiency fluorescent lighting, by modifying the frequency response of a signal output from a photodetector. A switchable high pass filter coupled to the photodetector has a first filter section with a first cutoff characteristic selected to pass signal components due to various types of lighting including high efficiency lighting, and a second section with second cutoff characteristic that separates out the high efficiency components. The high pass output is processed by a log amplifier to develop flicker frequency harmonics that are distinguished as to source illuminant by comparator stages. Undersampling artifacts due to high efficiency lighting are present in the mixed illuminant spectrum when the first filter section is operative, and positively identified as high efficiency lighting when the second section is operative. Consequently, when mixed illuminants are discriminated by the first section, they are further tested for a high efficiency source in the second section.

19 Claims, 3 Drawing Sheets

→ Fluorescent
---→ High Eff. Lighting
⟶ Tungsten

ILLUMINANT DISCRIMINATOR PROVIDING DETECTION OF HIGH EFFICIENCY ILLUMINATION

FIELD OF THE INVENTION

The present invention relates to the field of source light determination and more particularly to an apparatus and an associated method for discriminating among various types of light sources, such as fluorescent light, incandescent light, mixed light, and natural daylight.

BACKGROUND OF THE INVENTION

To produce faithful photographic reproductions of multicolored scenes, the color balance of the photographic film must be compatible with the spectral characteristics of the scene illuminant. Many photographic color emulsions are color balanced for use with natural daylight and others are color balanced for use with incandescent illumination. To properly expose a color film with an illuminant for which the film is not color balanced it is necessary to use color compensating filters. Alternatively, correction can be made during the printing stage. When such compensation is automatically provided by the camera, by engaging the proper filter or by marking the film with a printing instruction, it is necessary to have some automatic technique for discriminating among various types of light sources.

A patent of interest for its teaching of a method and apparatus for discriminating illuminant light is U.S. Pat. No. 4,220,412, entitled "Illuminant Discrimination Apparatus and Method" by R. A. Shroyer, et al. The method and apparatus disclosed in that patent utilizes the temporal signatures of the various light components based upon the peak amplitude and the harmonic distortion in the sine wave signal that is derived from the illuminant source impinging on a photodiode. The photodiode produces an electrical signal having an amplitude which varies with the instantaneous intensity of the illuminant. The apparatus includes flicker ratio detecting circuitry which is capable of discriminating between pure fluorescent light, pure incandescent light and pure daylight. The flicker ratio is the ratio of the brightest to the dimmest intensities of the light during a given time interval. Natural light, like other light emanating from a source of constant brightness, has a flicker ratio of unity. Artificial light sources, being energized by ordinary household line voltage, have a brightness which flickers at approximately 120 Hz, twice the frequency of the line voltage. Owing to the different rates at which the energy-responsive elements of incandescent and fluorescent lamps respond to applied energy, such illuminance can be readily distinguished by their respective flicker ratio. A circuit also detects the amount of harmonic distortion in the signal. Using the harmonic content, it is further possible to distinguish incandescent light from fluorescent light mixed with daylight and to detect which light source is predominant in a mixture of fluorescent and incandescent light.

With the general interest in digital systems, it is useful to incorporate illuminant discrimination into a digital environment. This is done in U.S. Pat. No. 4,827,119, which discriminates among various types of illuminants such as fluorescent light, tungsten light and natural daylight. The apparatus is comprised of an analog portion and a digital portion. The analog portion functions to convert incident light into a conditioned analog signal. The digital portion utilizes an analog-to-digital converter and a microprocessor to perform a Fourier series analysis on one or more of the harmonics of the illuminant signal. The microprocessor compares the amplitudes of the harmonics against the amplitudes of known illuminant sources to identify the source.

In certain situations it is desirable to separate scenes having a dominant illuminant from scenes having mixed illumination with no single dominant illuminant. In U.S. Pat. No. 5,037,198, mixed illuminant detection is added to the choice of illuminant categories to take care of the cases where one illuminant is not dominant. In such cases, color correction is best handled by printing algorithms. Boundary conditions are used, based on thresholding, to eliminate detection errors seen when fluorescent illumination mixes with certain quantities of daylight and otherwise causes a tungsten reading. The apparatus is comprised of a means for converting illuminate light into corresponding electrical signals. The electrical signals are then directed to a log amplifier wherein they are compressed to form a signal approximately equal to the log of the DC term plus a ratio of the dominant AC components to the DC components. A second portion of the apparatus receives the signals from the log amplifier and provides two filtered outputs which are multiples of the frequency of expected artificial illumination sources. Each of the output signals is compared against a plurality of threshold signals to identify which illuminant components are present. The combination of detected components are then compared against the components of known illumination sources with the closest match identifying the unknown source. Means are provided for combining the output signals from both of the filters to identify mixed sources.

The methods employed in U.S. Pat. Nos. 4,827,119 and 5,037,198 examine the frequency of flicker in the light intensity spectrum and determine from the frequency harmonics which type of illumination is being used. A problem has arisen because new fluorescent lighting systems use power inverters to increase the frequency of operation and the efficiency of the light sources. With such high efficiency fluorescent illumination, it is difficult to detect these higher frequencies, which are as high as 70 kHz, due to speed limitations in the circuit topologies typically used in amplification of the signal generated by the photodiode detector. Because the ripple amplitude is diminished at such frequencies, using boundary conditions such as described in U.S. Pat. No. 5,037,198 would detect such lighting as mixed lighting. The color of such light, however, is closely related to the color of fluorescent light, and it would be desirable to detect high efficiency lighting as such.

SUMMARY OF THE INVENTION

The present invention is directed to overcoming one or more of the problems set forth above. Briefly summarized, according to one aspect of the present invention, an illuminant discriminator comprises a photodetector for converting an impinging illuminant into an analog signal and a high pass filter coupled to the photodetector, wherein the high pass filter has a cutoff frequency selected to separate signal components due to high efficiency light which are then detected to indicate the presence of such lighting.

In a further embodiment, the high pass filter includes a first section with a first cutoff characteristic selected to pass signal components due to various types of lighting including high efficiency lighting, and a second section with a second cutoff characteristic selected to separate signal components due to high efficiency lighting from signal components due to other types of lighting. The type of illumination is then discriminated based on activation of the different filter sections such that tungsten and fluorescent lighting can be distinguished by the first section, and when mixed lighting is indicated by the first section then high efficiency lighting can be distinguished from mixed lighting by the second section.

The advantage of the invention is that a photodiode amplifier for camera photometer applications capable of detecting known flicker frequencies can additionally detect new high efficiency lighting by changing its input frequency response. This is specifically done by means of a high pass filter that exhibits different frequency responses based on the state of one or more analog switches. This can be done without substantially modifying the circuit topology of the amplifying section.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The invention will be described in relation to the drawings, in which.

DETAILED DESCRIPTION OF THE INVENTION

Figure 1:
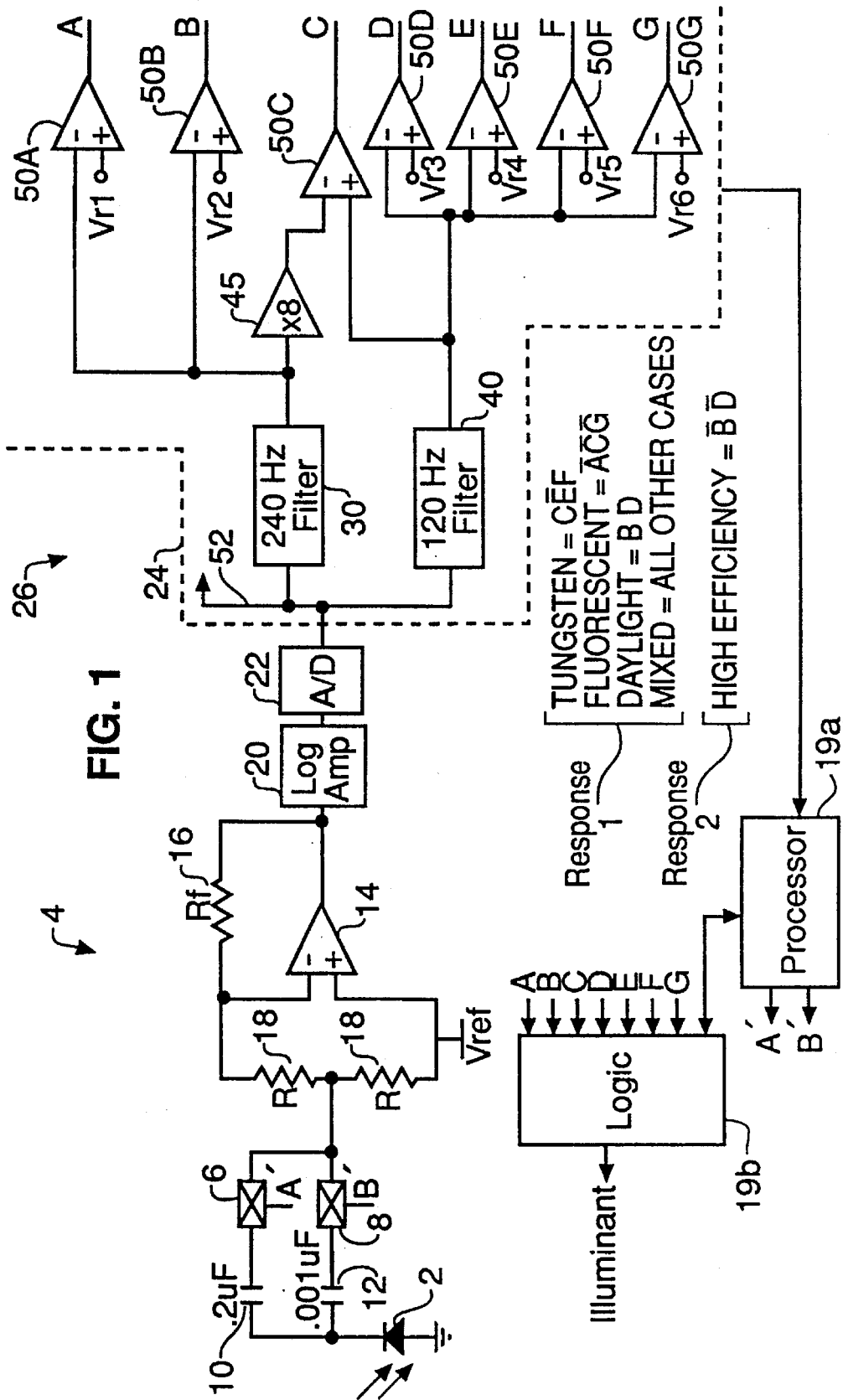
FIG. 1 illustrates in block diagram a preferred apparatus implementation of the present invention.

Referring to FIG. 1, illuminant light is detected with a photodiode 2 to provide an electrical signal which is a function of the spectral content of the illuminant light. The photodiode 2 responds to incident light by producing a voltage that is logarithmically related to the intensity of light impinging thereon. When the light is from an artificial source, such as a fluorescent or incandescent lamp driven by a line voltage operating at a predetermined frequency, the photodiode produces a voltage having a DC component (or average value) proportional to the average light intensity and an AC component having a fundamental frequency that is proportional to twice the frequency of the line voltage (i.e., twice a conventional household line frequency of 60 Hz, for a fundamental of 120 Hz). In addition, as explained in U.S. Pat. No. 4,220,412 (which is incorporated herein by reference), the brightness curve of the fluorescent source contains more harmonic distortion (i.e., distortion due to the presence of harmonic frequency components other than the fundamental) than does the incandescent source.

As a special feature of the invention, the signal from the photodiode 2 is processed by a switched high pass filter 4. The switching portion includes analog switches 6 and 8 connected to switching lines A' and B', respectively, to connect either capacitor 10 or capacitor 12 into the high pass circuit. An operational amplifier 14 is connected as a high pass filter with a feedback resistor 16 and a voltage divider network 18 connected to a reference voltage $V_{ref}$.

Figure 3A:
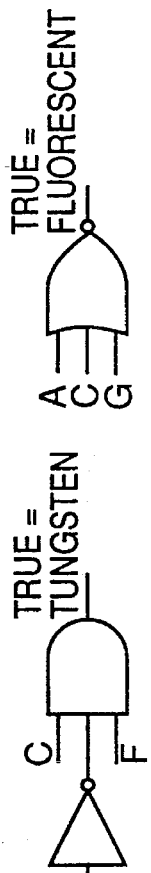
FIGS. 3A, 3B, 3C, and 3D illustrate in logic circuit form one set of combinational logic that may be used with the preferred apparatus implementation of FIG. 1.
Figure 3B:
Figure 3C:
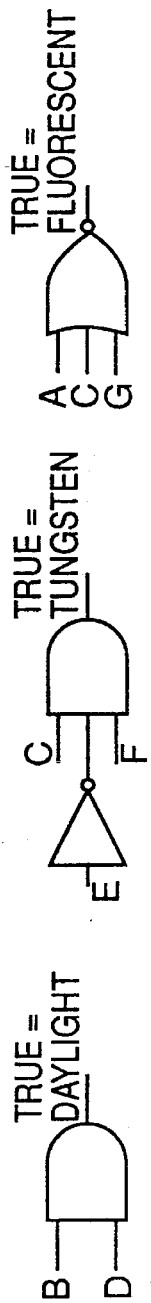
Figure 3D:
Figure 4:
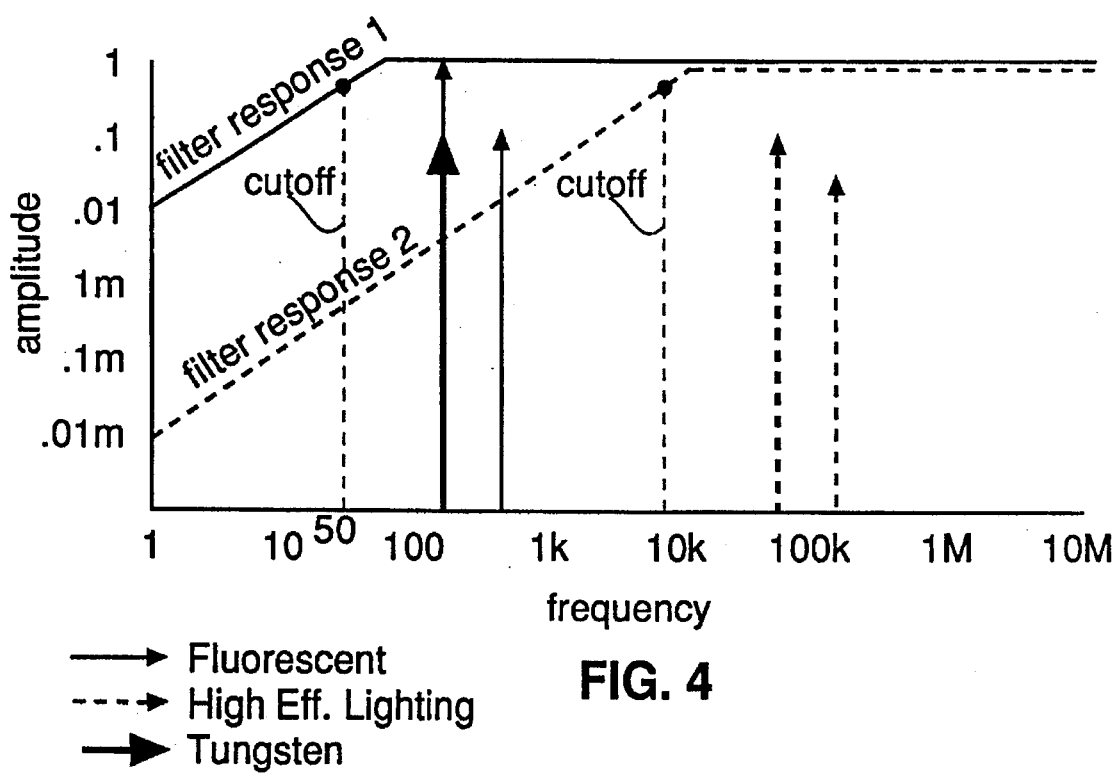
FIG. 4 is a frequency spectrum diagram of various light sources showing cut-off characteristics of filters used with the preferred apparatus implementation of FIG. 1.

FIG. 4 shows the frequency response envelopes, designated as filter response 1 and filter response 2, of the switched high pass filter 4 relative to the normalized filter frequency spectrum for different light types, including tungsten, fluorescent, and high efficiency lighting. In the preferred embodiment, for suitable resistances 18, these envelopes are obtained by selecting a 0.2 µf capacitor and a 0.001 µf capacitor for capacitors 10 and 12, respectively. Switching lines A' and B' are activated by a processor 19a in response to an indication from a combinational logic section 19b, which includes the logic circuits shown in FIGS. 3A, 3B, 3C, and 3D. By activating analog switch 6 to select capacitor 10, the filter response 1 is obtained with a cutoff frequency (at 3 dB down) of about 50 Hz; and by activating analog switch 8 to select capacitor 12, the filter response 2 is obtained with a cutoff frequency (at 3 dB down) of about 10 kHz. It is important that filter response 1 includes all lighting and filter response 2 effectively eliminates fluorescent and tungsten lighting.

Returning to FIG. 1, the output signal from the switched high pass filter 4 is compressed by a logarithmic amplifier 20. The output signal from logarithmic amplifier 20, given the relative amplitudes of the various frequency components of the input signal as processed by the switched high pass filter 4, is approximately equal to a log of the DC term plus a ratio of the dominant AC components to the DC components. Several AC:DC ratios are present at the output of the log amp 20, in particular a fundamental AC/DC ratio and a second harmonic AC/DC ratio. As explained in U.S. Pat. No. 5,037,198, which is incorporated herein by reference, the output of the log amp 20 is a discriminator signal having a collection of harmonic components that can be mapped into the coordinate system shown in FIG. 2, which shows the performance of the system in terms of AC/DC amplitude ratios. The amplitude of each harmonic component, as explained in the '198 patent, is a measure of the type of illumination present.

An A/D converter 22 receives on its input the discriminator signal from the output of the log amp 20 and operates upon the analog discriminator signal to provide a corresponding digital signal at its output. The digitized signal is then directed to a microprocessor 26, which is programmed as a digital filter to perform the filtering and comparing operations shown within the broken line 24. In doing so, the microprocessor 26 operates upon the fundamental frequency component and one or more harmonic components of the digitized input signal and determines from evenly spaced samples the fundamental frequency and the second harmonic (as well as passing undersampling artifacts from higher frequencies, see below). The amplitudes of each frequency are determined by the square root of the squares of the sine and cosine terms. As described in the aforementioned U.S. Pat. No. 4,827,119, which is incorporated herein by reference, it is convenient to determine the fundamental frequency and the second harmonic from 8 samples spaced 1.042 ms. apart, assuming 60 Hz line frequency. Clearly, such a sampling frequency is far too low to reproduce a high efficiency lighting waveform. However, the sampling rate appropriate for tungsten and conventional fluorescent lighting produces enough sampling artifacts (due to undersampling) within the frequency spectrum represented by FIG. 2 to provide the basis, according to the invention, for distinguishing high efficiency lighting from other lighting.

The digitized discriminator signal is filtered by a 240 Hz digital filter 30 and a 120 Hz digital filter 40. The outputs of the filters 30 and 40 thus correspond to the coordinates in FIG. 2. The filter outputs are processed by comparator stages 50A–50G. Each of the comparator stages receives a threshold reference Vr1–Vr6. The reference values assigned to Vr1–Vr6 are determined from the chart of FIG. 2. The stage 50C receives the output signals from both filters 30 and 40 with the output from the 240 Hz filter 30 being boosted in gain by a factor of 8 in a gain stage 45. The comparator stages 50A and 50B form a first comparing means. A second comparing means is formed by comparator stages 50D through 50G, and comparator stage 50C along with gain stage 45 form a third comparing means. Although various types of logic functions can be used to form the desired outputs from the outputs A–G, the preferred logic is illustrated in FIGS. 3A–D. As can be seen in FIGS. 3A–3C, daylight requires both a B and a D input. Tungsten requires a C and an F input but not E, and fluorescent takes not A, not C, and not G.

The foregoing logic combinations are obtained with the analog switch 6 set to include capacitor 10 in the switched high pass filter 4; that is, filter response 1 (FIG. 4) is used, and, under that condition, all other input combinations reflect a mixed illuminant. The logic combination of FIG. 3D is used when the analog switch 8 is set to include capacitor 12 in the switched high pass filter 4; that is, filter response 2 is used, and high efficiency illumination is isolated. Under that condition, high efficiency illumination requires a not B and not D.

Figure 2:
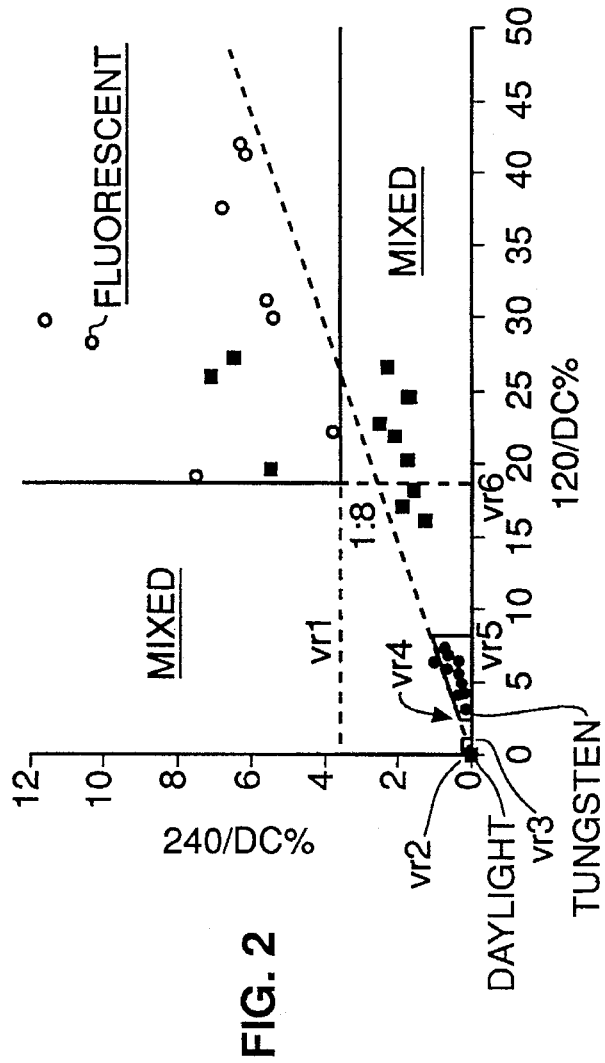
FIG. 2 is a chart illustrating the performance characteristics of the apparatus of FIG. 1.

FIG. 2 illustrates, for filter response 1, the data taken from several light sources plotted such that the 120 Hz/DC ratio is the ordinate axis and the 240 Hz/DC ratio is the vertical axis. The boundary regions for mixed, fluorescent, daylight and tungsten illumination are also illustrated in FIG. 2. The daylight region (area) is defined by the voltage values Vr2 and Vr3 which exists around the (0,0) region. The tungsten region is defined by Vr4, Vr5 and a dotted gain line. The mixed regions are set off by Vr1, Vr6 and the dotted gain line. In the mixed regions there are additional data, where there is no predominant illuminant category present. A diagonal boundary condition which is formed by the X8 diagonal gain line of amplifier 45 further defines the mixed region, particularly relative to tungsten light. Moreover, there is a lower limit on the ratio 240 Hz:120 Hz. For the purposes of an easy implementation, the slope of 1:8 was chosen since it results in a low percentage of tungsten falling into the mixed region; however, this ratio may be a little smaller for optimum discrimination. Although there are no line harmonics present in daylight lit scenes, there is a possibility of dominantly daylight lit scenes so a region close to the origin has been set aside as daylight. Finally, note in particular that sampling artifacts due to undersampled high efficiency data are found within the frequency spectrum shown in FIG. 2. These sampling artifacts are not shown in FIG. 2 as one of the primary flicker components, but are understood to be present in the spectrum.

In operation, the illuminant discriminator is initially set to filter response 1 by activation of the analog switch 6 from the processor 18a. If the resulting data indicates, by use of combinatorial logic in FIGS. 3A to 3C, the presence of mixed lighting (i.e., all outputs are FALSE), then the logic section 19b commands the processor 19a to deactivate analog switch 6 and activate analog switch 8, thereby setting the illuminant discriminator to filter response 2. The high cutoff frequency (10 kHz) substantially eliminates the low frequency flicker components (as shown in FIG. 2) and any remaining component will be indicative of sampling artifacts due to high efficiency lighting. The combinatorial logic of FIG. 3D will detect such remaining artifacts due to high efficiency lighting, and the logic circuit 19b will provide a corresponding output. (Alternatively, a separate line 52 can be used from the A/D converter 22 to test for high efficiency lighting, since any signal component that is detected for filter response 2 is indicative of high efficiency lighting.) If filter response 2 provides no substantial output, mixed lighting is assumed and correction is left to printing.

This technique does not limit itself to one particular method of implementation. The block diagram of FIG. 1 illustrates the preferred embodiment, implemented with comparator stages in a digital system. Such a digital implementation is shown in the aforementioned U.S. Pat. No. 4,827,119, which is incorporated herein by reference. Frequency components listed are those seen in regions where 60 Hz power grids are used but they can be extended by replacing 120 Hz with the 2nd harmonic of the line frequency and 240 Hz with the 4th harmonic, etc.

While there has been shown what is considered to be the preferred embodiment of the present invention, it will be manifest that many changes and modifications may be made therein without departing from the essential spirit of the invention. It is intended therefore, in the annexed claims to cover all such changes and modifications as may fall within the true scope of the invention. Moreover, the separate filter responses could be achieved by using two separate high pass filters, although it is desirable from the standpoints of circuit size and cost to devise a single circuit as shown in FIG. 1 which can be configured to alter the frequency response.

| PARTS LIST | |
| --- | --- |
| 2 | PHOTODIODE |
| 4 | SWITCHED HIGH PASS FILTER |
| 6 | ANALOG SWITCH |
| 8 | ANALOG SWITCH |
| 10 | CAPACITOR |
| 12 | CAPACITOR |
| 14 | OPERATIONAL AMPLIFIER |
| 16 | FEEDBACK RESISTOR |
| 18 | VOLTAGE DIVIDER |
| 19a | PROCESSOR |
| 19b | LOGIC CIRCUIT |
| 20 | LOG AMP |
| 22 | A/D CONVERTER |
| 24 | FILTERING AND COMPARING OPERATIONS |
| 26 | MICROPROCESSOR |
| 30 | 240 Hz FILTER |
| 40 | 120 Hz FILTER |
| 45 | GAIN STAGES |
| 50A–50G | COMPARATOR STAGES |
| 52 | LINE |

The invention claimed is:

1. An illuminant discriminator comprising:

photodetector means for converting an impinging illuminant into an analog signal;

high pass filter means coupled to said photodetector means and having a first section with a first cutoff characteristic selected to pass signal components due to various types of lighting including high efficiency lighting, and a second section having a second cutoff characteristic selected to separate signal components due to high efficiency lighting from signal components due to other types of said various types of lighting;

means for switching between the first section and the second section in order to separate the signal components passed by the respective sections having the respective cutoff characteristics; and means coupled to said high pass filter means for detecting a presence of signal components due to high efficiency lighting, said means coupled to said high pass filter means comprising means responsive to said switching means for first analyzing the signal components passed by the first cutoff characteristic to determine if the illuminant is other than high efficiency lighting and, where this analysis is indeterminate, secondly analyzing the signal components passed by the second section to determine if the illuminant is high efficiency lighting.

2. The illuminant discriminator as claimed in claim 1 wherein said means coupled to said high pass filter means for detecting a presence of signal components comprises comparing means adapted to receive an output from the high pass filter means and a threshold signal corresponding in level to signal components of the high efficiency light.

3. The illuminant discriminator as claimed in claim 1 wherein an A/D converter generates a digital signal from an analog signal output by said high pass filter means, and wherein the digital signal is applied to the means coupled to said high pass filter means for detecting a presence of signal components due to high efficiency lighting.

4. The illuminant discriminator as claimed in claim 3 further including a microprocessor, and wherein the means coupled to the high pass filter means for detecting a presence of signal components comprises a program performed by said microprocessor.

5. The illuminant discriminator as claimed in claim 3 wherein said A/D converter undersamples the high efficiency light, and wherein said means coupled to said high pass filter means for detecting a presence of signal components detects undersampling artifacts due to high efficiency lighting.

6. An illuminant discriminator as claimed in claim 1 wherein said first section of said high pass filter means has a filter response that passes signal components due to tungsten, fluorescent, and high efficiency lighting, and said second section of said high pass filter means has a filter response that passes signal components due to high efficiency lighting and attenuates signal components due to tungsten and fluorescent lighting.

7. An illuminant detector as claimed in claim 6 wherein said analog signal is sampled and digitized, and wherein said means coupled to said high pass filter means for detecting a presence of signal components comprises digital filter means for filtering signal components due to different types of lighting and digital comparator stages for identifying the signal components.

8. An illuminant discriminator comprising:
    photodetector means for converting an impinging illuminant into an analog signal:
    a high pass filter circuit including a first passband including frequencies from a variety of artificial illuminants, and a second passband including frequencies from a particular artificial illuminant, and first and second switches for switching respective capacitances into the high pass filter circuit whereby one capacitance provides a low frequency cutoff for the first passband and a second capacitance provides a high frequency cutoff for the second passband;
    a log means coupled to said high pass filter means for converting said analog signal into a signal having a DC component and a ratio component;
    a first and a second filter means each having a filtering frequency corresponding to the harmonic frequencies of an artificial illuminant power source;
    first and second comparator stages each having at least two inputs, one of which is coupled to receive an output from said first and said second filter means, respectfully, and an other of which is adapted to receive threshold signals corresponding in level to a level of different types of illuminants for providing at least one output indicating a magnitude of the outputs from said first and said second comparing means with respect to the threshold signals;
    a third comparator stage for comparing the output of said first filter means with the output from said second filter means and for providing an output indicating which is greater;
    means for setting an output of the high pass filter means to either the first passband or the second passband; and
    logic means coupled to the outputs of said first, second, and third comparator stages and to said setting means for determining a type of illuminant impinging on said photodetector means from the outputs sensed by said comparing means, said logic means comprising means responsive to the switching of said first and second switches for first analyzing the analog signal passed by the first passband to determine if the illuminant is other than the particular artificial illuminant and, where this analysis is indeterminate, secondly analyzing the analog signal passed by the second passband to determine if the illuminant is the particular artificial illuminant.

9. The illuminant discriminator as claimed in claim 8 wherein the second passband includes frequencies from a high efficiency illuminant.

10. The illuminant discriminator according to claim 9 wherein an analog signal output by said log means is digitized, said first and second filter means comprising first and second digital filters and said first and second comparator stages are comprised of a plurality of digital comparator stages each having at least two inputs for receiving on one of its inputs a respective digital output from said digital filters and for receiving on at least one other input digital threshold signals.

11. The illuminant discriminator of claim 10 wherein said third comparator is comprised of:
    a digital gain stage having an input connected to the digital output of said first digital filter for providing a multiple gain to the digital output from said first digital filter;
    a digital comparator stage means having two inputs one of which is connected to a digital output of said digital gain stage and a second of which is connected to the digital output of said second digital filter for providing an output indicating which is greater.

12. The illuminant discriminator of claim 11 wherein two of said plurality of digital comparator stages are connected to the digital output of said first digital filter and four of said plurality of digital comparator stages are connected to the digital output of said second digital filter.

13. The illuminant discriminator of claim 12 wherein a filtering frequency of said first digital filter is 240 Hz and a filtering frequency of said second digital filter is 120 Hz.

14. The illuminant discriminator of claim 13 wherein the multiple gain of said digital gain stage is 8.

15. The illuminant discriminator of claim 14 wherein a threshold signal applied to a first of two digital comparator stages connected to the digital output of said first digital filter is set to a value corresponding to a lower limit of fluorescent light established by the ratio 240/DC %, and a threshold signal applied to a second of the two digital comparator stages connected to said first digital filter is set to a value corresponding to a limit of daylight established by a ratio 240/DC %.

16. The illuminant discriminator according to claim 15 wherein a threshold signal applied to a first of the four digital comparator stages connected to said second digital filter is set to a value corresponding to a limit of daylight established by a ratio 120/DC %, and wherein a threshold signal applied to a second of the four digital comparator stages connected to an output of said second digital filter is set to a value of a lower limit of tungsten light established by a ratio 120/DC %, and wherein a threshold signal applied to a third of the four digital comparator stages connected to an output of said second digital filter means is set to a value corresponding to an upper limit of tungsten light as established by the ratio 120/DC %, and wherein a threshold signal applied to a fourth of the four digital comparator stages connected to said second digital filter is set to a value corresponding to a lower limit of fluorescent light as established by the ratio 120/DC % so as to establish boundaries for fluorescent, daylight, tungsten, and mixed illuminants.

17. The illuminant discriminator according to claim 16 wherein a cutoff frequency for the second passband is set to a level that substantially eliminates frequency components due to fluorescent and tungsten lighting, therefore passing frequency components due to high efficiency lighting.

18. The illuminant discriminator according to claim 17 wherein the sampling frequency selected for sampling the analog signal is sufficient for tungsten and fluorescent lighting, but insufficient for high efficiency lighting such that the high efficiency frequencies are undersampled, and artifacts thereof are passed by both the first and second passbands.

19. A method for determining an illuminant impinging on a photodetector comprising the steps of:

high pass filtering a signal from said photodetector according to two filter responses, including a first response selected to pass signal components due to various types of lighting including high efficiency lighting, and a second response selected to separate signal components due to high efficiency lighting from signal components due to said various types of lighting;

first analyzing the signal components passed by the first response to determine if the illuminant is other than high efficiency lighting; and, where this step is indeterminate;

secondly analyzing the signal components passed by the second response to determine if the illuminant is high efficiency lighting.

* * * * *